(12) United States Patent
Elsesser

(10) Patent No.: US 10,151,355 B2
(45) Date of Patent: Dec. 11, 2018

(54) USING PHASE CHANGE MATERIALS FOR TEMPERATURE MANAGEMENT IN CLUTCH ASSEMBLIES, TORQUE CONVERTER CLUTCH ASSEMBLIES, AND BRAKE ASSEMBLIES

(71) Applicant: BORGWARNER, INC., Auburn Hills, MI (US)

(72) Inventor: Paul H. Elsesser, Glen Ellyn, IL (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/645,543

(22) Filed: Mar. 12, 2015

(65) Prior Publication Data

US 2015/0275993 A1  Oct. 1, 2015

Related U.S. Application Data

(60) Provisional application No. 61/973,531, filed on Apr. 1, 2014.

(51) Int. Cl.
| | |
|---|---|
| *F16D 13/72* | (2006.01) |
| *F16D 13/52* | (2006.01) |
| *F16D 65/18* | (2006.01) |
| *F16D 13/64* | (2006.01) |
| *F16D 65/78* | (2006.01) |

(Continued)

(52) U.S. Cl.
CPC ............ *F16D 13/72* (2013.01); *F16D 13/52* (2013.01); *F16D 13/648* (2013.01); *F16D 65/186* (2013.01); *F16D 2065/781* (2013.01); *F16D 2121/28* (2013.01); *F16D 2121/32* (2013.01); *F16D 2300/02* (2013.01); *F16D 2300/021* (2013.01)

(58) Field of Classification Search
CPC ..... F16D 65/78; F16D 2065/781; F16D 13/72
See application file for complete search history.

(56) References Cited

U.S. PATENT DOCUMENTS 2,858,111 A * 10/1958 Aydelott ............. F28D 1/05383
138/32
2,943,714 A * 7/1960 Aldrich .................. F16D 55/40
188/218 XL (Continued)

OTHER PUBLICATIONS

Aaron Gold, Understanding Torque Converters, Banks Power.

*Primary Examiner* — Bradley T King
*Assistant Examiner* — James K Hsiao
(74) *Attorney, Agent, or Firm* — Miller, Matthias & Hull LLP

(57) ABSTRACT

A clutch assembly, a torque converter clutch assembly, and a brake assembly for a vehicle are disclosed. The clutch assembly and the brake assembly may have at least one reaction plate comprising an internal cavity containing a phase change material. The torque converter clutch assembly may have a front cover plate comprising an internal cavity containing a phase change material. The phase change material may be capable of absorbing at least some friction-induced heat generated at a friction interface of the reaction plate or front cover plate when the clutch assembly, the torque converter assembly, or the torque converter assembly is shifted to a closed position, such as when the clutch is activated or when the brakes are applied.

14 Claims, 6 Drawing Sheets

(51) Int. Cl.
*F16D 121/28* (2012.01)
*F16D 121/32* (2012.01)

(56) References Cited

U.S. PATENT DOCUMENTS

| | | | | |
|---|---|---|---|---|
| 3,376,960 A * | 4/1968 | Bender | ............... | F16D 55/40 |
| | | | | 188/218 XL |
| 3,376,961 A * | 4/1968 | Horner | ............... | F16D 65/121 |
| | | | | 188/218 XL |
| 3,403,759 A * | 10/1968 | Holcomb, Jr. | ......... | F16D 55/40 |
| | | | | 188/218 R |
| 3,456,768 A * | 7/1969 | Holcomb, Jr. | ......... | F16D 55/40 |
| | | | | 188/218 XL |
| 3,459,284 A * | 8/1969 | Wray | ............... | F16D 65/125 |
| | | | | 188/264 CC |
| 3,478,850 A * | 11/1969 | Abu-Akeel | ............ | F16D 55/40 |
| | | | | 188/218 XL |
| 3,481,439 A * | 12/1969 | Finkin | ............... | F16D 13/72 |
| | | | | 165/104.26 |
| 3,575,270 A * | 4/1971 | Wagenfuhrer | ...... | F16D 65/0006 |
| | | | | 188/218 A |
| 3,651,895 A * | 3/1972 | Whitfield | ............... | F16D 65/84 |
| | | | | 188/264 CC |
| 3,658,751 A * | 4/1972 | Grazen et al. | ........... | C08J 3/12 |
| | | | | 523/157 |
| 3,724,613 A * | 4/1973 | Bermingham | ........ | F16D 69/027 |
| | | | | 188/218 XL |
| 3,753,476 A * | 8/1973 | Dernovashek | ........ | F16D 65/121 |
| | | | | 188/218 XL |
| 3,767,612 A * | 10/1973 | Grazen et al. | ........... | C08G 8/36 |
| | | | | 523/158 |
| 3,850,874 A * | 11/1974 | Grazen et al. | ........... | C08G 8/36 |
| | | | | 523/158 |
| 3,895,693 A * | 7/1975 | Lucien | ............... | F16D 65/121 |
| | | | | 188/218 XL |
| 3,917,043 A * | 11/1975 | Bok | ............... | F16D 13/64 |
| | | | | 188/218 XL |
| 4,119,179 A * | 10/1978 | Masclet | ............... | F16D 55/40 |
| | | | | 188/218 XL |
| 4,503,838 A * | 3/1985 | Arrhenius | ............. | C09K 5/063 |
| | | | | 126/263.03 |
| 5,139,118 A * | 8/1992 | Schenk | ............... | F16D 65/128 |
| | | | | 188/218 A |
| 5,143,184 A * | 9/1992 | Snyder | ............... | F16D 13/64 |
| | | | | 188/218 A |
| 5,149,334 A * | 9/1992 | Lahrman | ............... | A61L 15/60 |
| | | | | 604/367 |
| 5,525,251 A * | 6/1996 | Hammond | ............. | C09K 5/063 |
| | | | | 252/70 |
| 5,558,186 A * | 9/1996 | Hyde | ............... | F16D 55/40 |
| | | | | 188/218 XL |
| 5,595,680 A * | 1/1997 | Bryant | ............... | C10M 171/001 |
| | | | | 252/572 |
| 5,613,578 A * | 3/1997 | Moseley | ............... | F16D 65/125 |
| | | | | 188/218 XL |
| 6,142,262 A * | 11/2000 | Bissonnette | ............ | F16D 55/36 |
| | | | | 188/218 A |
| 6,528,132 B1 * | 3/2003 | Naerheim | ............... | F16D 65/12 |
| | | | | 188/264 D |
| 8,464,852 B2 | 6/2013 | Simon et al. | | |
| 2002/0020601 A1 * | 2/2002 | Martin | ............... | F16D 25/0638 |
| | | | | 192/85.4 |
| 2002/0187903 A1 * | 12/2002 | Sato | ............... | C10M 169/045 |
| | | | | 508/192 |
| 2003/0145447 A1 * | 8/2003 | Moseley | ............... | C04B 35/83 |
| | | | | 29/458 |
| 2003/0217904 A1 * | 11/2003 | Ando | ............... | F16D 27/115 |
| | | | | 192/107 M |
| 2004/0194908 A1 * | 10/2004 | Tomohide | ............ | F28D 20/021 |
| | | | | 165/10 |
| 2008/0146474 A1 * | 6/2008 | Takahashi | ............ | C10M 141/10 |
| | | | | 508/390 |
| 2010/0000070 A1 * | 1/2010 | La Forest | ............... | C04B 35/83 |
| | | | | 29/525.06 |
| 2010/0013620 A1 | 1/2010 | Degenstein et al. | | |
| 2012/0118685 A1 * | 5/2012 | Johnson | ............... | B64C 25/42 |
| | | | | 188/218 XL |
| 2012/0216981 A1 * | 8/2012 | Bank | ............... | C09K 5/063 |
| | | | | 165/10 |
| 2012/0304792 A1 * | 12/2012 | Mayr | ............... | C10M 173/02 |
| | | | | 74/412 R |

* cited by examiner

USING PHASE CHANGE MATERIALS FOR TEMPERATURE MANAGEMENT IN CLUTCH ASSEMBLIES, TORQUE CONVERTER CLUTCH ASSEMBLIES, AND BRAKE ASSEMBLIES

CROSS-REFERENCE TO RELATED APPLICATION

This application is a non-provisional application claiming priority under 35 U.S.C. § 119(e) to U.S. Provisional Patent Application No. 61/973,531 filed on Apr. 1, 2014.

FIELD OF THE DISCLOSURE

The present disclosure generally relates to clutch assemblies, torque converter clutch assemblies, and brake assemblies, and more specifically, relates to clutch assemblies, torque converter clutch assemblies, and brake assemblies having plates containing phase change materials.

BACKGROUND

An automotive vehicle typically includes an engine having a crankshaft that transfers power from the engine and through a driveshaft to turn the wheels. A transmission may be interposed between the engine and the driveshaft to regulate torque and speed ratios between the crankshaft and the driveshaft. In a manually-operated transmission, a manually operated clutch may be interposed between the engine and the transmission to allow controlled disengagement of the crankshaft and the driveshaft and enable shifting between available transmission gear ratios. In an automatic transmission, a series of clutch assemblies, or clutch modules, may be positioned behind a torque converter assembly along the power path leading from the engine to the wheels, and they may be adapted to dynamically shift between available gear ratios without requiring driver intervention.

In general, a clutch assembly may include a hub, an alternating sequence of friction plates and reaction plates (or separator plates), and an outer housing surrounding the hub and the alternating sequence of friction plates and reaction plates. A wet clutch assembly (as opposed to a dry clutch assembly) may further include a transmission fluid which flows through the clutch assembly. In some arrangements, each of the friction plates may be splined to and rotatable with the hub, while each of the reaction plates may be splined to the outer housing, although the opposite arrangement is also possible. When the clutch assembly is in an open position, the reaction plates and the friction plates may be spaced apart and capable of rotating at different speeds and/or in different directions independently of each other. When the clutch assembly is activated, the clutch assembly is shifted to a closed position in which the friction plates and the reaction plates are pressed together to restrict their relative rotations.

A torque converter clutch assembly in an automatic transmission is a device capable of transferring torque from the engine to the transmission. A torque converter assembly may include a front cover plate connected to the engine, an impeller connected to a front cover plate, a turbine connected to an input shaft of the transmission, a stator, at least one piston plate attached to the turbine and interposed between the turbine and the front cover plate. In addition, it may also include a transmission fluid flowing through the assembly, as well as various additional components. In operation, power from the engine may be transmitted to the impeller via the front cover, causing the impeller to revolve and push transmission fluid against the turbine. In turn, the turbine may revolve and transmit power to the input shaft of the transmission. The torque converter assembly may be capable of selectively shifting between an open position (or turbine mode in which the turbine may multiply torque) and a closed position in which the piston plate may be hydraulically pushed against the front cover plate to create a direct connection between the engine and the transmission. For example, a torque converter assembly may be in the open position (or turbine mode) to allow fast acceleration from a stop, and it may be shifted to the closed position as the vehicle gains speed.

The overall structural configuration and mechanism of clutch assemblies may be similar to those of brake assemblies, including wet brake assemblies and dry brake assemblies. In particular, a brake assembly may generally include a hub, an alternating sequence of brake plates and reaction plates (or separator plates), and an outer housing surrounding the hub and the alternating sequence of brake plates and reaction plates. A wet brake assembly may further include a brake fluid, whereas a dry brake assembly may lack a brake fluid. Each of the brake plates may be splined to and rotatable with the hub, while the reaction plates may be splined to and held stationary with the outer housing. When the brakes are applied, the brake assembly may shift from an open position in which the brake plates and the reaction plates are separated to a closed position in which the brake plates and the reaction plates are pressed together to restrict relative rotation between the plates.

While above assembly designs are effective, during the proper functioning of a clutch assembly, a torque converter clutch assembly, and a brake assembly, a substantial amount of friction-induced heat may be generated at friction interfaces between the reaction plates and friction plates/brake plates (in a clutch assembly or a brake assembly) and between the piston plate and front cover plate (in a torque converter clutch assembly) as the plates are engaged and pressed together while shifting to the closed position. The friction arises due to the relative motion between the plates as they are engaged, but will dissipate as the plates are locked-up or rotating at the same speed in the closed position. The friction-induced heat that is generated during the engagement of the plates in the aforementioned assemblies may lead to a sharp temperature rise at the friction interface(s), at least until there is no longer relative motion between the plates. As the reaction plates (in a clutch assembly and a brake assembly) and the front cover plate (in a torque converter clutch assembly) may be formed from steel or another heat-conducting metal, the generated heat will be initially absorbed on the surface of the plates. It may then be transferred to the outer housing of the assembly and/or the transmission fluid or brake fluid, and it may eventually dissipate to the surroundings. However, if temperature spikes at the friction interfaces are too high, the reaction plates or the front cover plate may undergo discoloration (or heat staining) and/or hot spotting in which localized regions of the metal material partially melt or liquefy to a molten state. In addition, friction material on the surface of the friction plates or brake plates (in a clutch assembly or a brake assembly) and on the surface of the piston plate (in a torque converter clutch assembly) may begin to deteriorate with repeated exposure to high temperatures, causing the coefficient of friction at the friction interfaces to drop. Even further, temperature-sensitive chemicals in the transmission fluid or brake fluid may also degrade upon exposure to sharp temperature spikes. Accordingly, with recurrent exposure to high temperatures caused by friction-induced heat, clutch assemblies, torque converter clutch assemblies, and brake assemblies may become damaged or even susceptible to failure.

Some prior art systems, such as U.S. Patent Application Number 2010/0013620, have incorporated temperature-sensing materials at friction linings on the surface of plates used in clutches or brakes for the purpose of detecting the operating temperature of the friction lining. However, clutch assembly, torque converter clutch assembly, and/or brake assembly designs incorporating protection mechanisms against temperature spikes at the friction interfaces between plates are still wanting.

Clearly, there is a need for strategies for managing temperatures at friction interfaces in clutch assemblies, torque converter clutch assemblies, and brake assemblies.

SUMMARY

In accordance with one aspect of the present disclosure, a clutch assembly for an automotive transmission is disclosed. The clutch assembly may comprise a hub capable of rotating about a central axis. It may further include a plurality of friction plates and a plurality of reaction plates arranged in an alternating sequence. The reaction plates and the friction plates may be capable of shifting between an open position in which the reaction plates and the friction plates are spaced apart from each other along the central axis, and a closed position in which the reaction plates and the friction plates are pressed together along the central axis. At least one of the reaction plates may have an internal cavity, and at least one phase change material may be contained in the internal cavity. The clutch assembly may further include an outer housing surrounding the hub and the alternating sequence of the reaction plates and the friction plates.

In another refinement, heat may be generated between the reaction plates and the friction plates when there is relative motion between the reaction plates and the friction plates in the closed position, and the at least one phase change material may be capable of absorbing at least some of the heat generated while undergoing a phase change.

In another refinement, each of the reaction plates may be splined to the outer housing, and each of the friction plates may be splined to the hub and may be rotatable with the hub about the central axis.

In another refinement, the at least one phase change material may comprise a phase change temperature at which the phase change occurs, and the phase change temperature may be between about 120° C. and about 300° C.

In another refinement, the phase change temperature of the phase change material may be between about 160° C. and about 180° C.

In another refinement, each of the reaction plates may be formed from steel.

In another refinement, the at least one reaction plate having the internal cavity may comprise a first portion and a second portion joined by a bond or other joining mechanism, and the internal cavity may be formed between the first portion and the second portion.

In another refinement, the phase change of the phase change material may be a change from a first solid crystal structure to a second solid crystal structure.

In another refinement, the phase change material may comprise a polyhydric alcohol blend.

In accordance with another aspect of the present disclosure, a torque converter clutch assembly for a vehicle is disclosed. The torque converter clutch assembly may comprise a front cover plate connected to an engine of the vehicle, and the front cover plate may have an internal cavity. The torque converter clutch assembly may further comprise an impeller connected to the front cover plate, a turbine connected to an input shaft of a transmission of the vehicle, and a piston plate interposed between the front cover plate and the turbine. In addition, the torque converter clutch assembly may further comprise at least one phase change material contained in the internal cavity of the front cover plate. The torque converter clutch assembly may be capable of shifting between an open position in which the piston plate is disengaged from the front cover plate, and a closed position in which the piston plate is pressed against the front cover plate.

In another refinement, heat may be generated at a friction interface between the piston plate and the front cover plate when there is relative motion between the piston plate and the front cover plate in the closed position, and the at least one phase change material may be capable of absorbing at least some of the heat generated while undergoing a phase change.

In another refinement, the at least one phase change material may comprise a phase change temperature at which the phase change occurs, and the phase change temperature may be between about 120° C. and about 300° C.

In another refinement, the phase change may be a change from a first solid crystal structure to a second solid crystal structure.

In accordance with another aspect of the present disclosure, a brake assembly for a vehicle is disclosed. The brake assembly may comprise a hub capable of rotating about a central axis. It may further include a plurality of brake plates and a plurality of reaction plates arranged in an alternating sequence. The reaction plates and the brake plates may be capable of shifting between an open position in which the reaction plates and the brake plates are spaced apart from each other along the central axis, and a closed position in which the reaction plates and the brake plates are pressed together along the central axis. At least one of the reaction plates may have an internal cavity, and at least one phase change material may be contained in the internal cavity. The brake assembly may further include an outer housing surrounding the hub and the alternating sequence of the reaction plates and the brake plates.

In another refinement, heat may be generated between the reaction plates and the brake plates when there is relative motion between the reaction plates and the brake plates in the closed position, and the at least one phase change material may be capable of absorbing at least some of the heat generated while undergoing a phase change.

In another refinement, each of the reaction plates may be splined to the outer housing, and each of the brake plates may be splined to the hub and may be rotatable with the hub about the central axis.

In another refinement, the at least one phase change material may comprise a phase change temperature at which the phase change occurs, and the phase change temperature may be between about 120° C. and about 300° C.

In another refinement, the phase change temperature of the phase change material may be between about 160° C. and about 180° C.

In another refinement, the brake assembly may be a wet brake assembly.

In another refinement, the at least one reaction plate having the internal cavity may comprise a first portion and a second portion joined by a bond or other joining mechanism, and the internal cavity may be formed between the first portion and the second portion.

These and other aspects and features of the present disclosure will be more readily understood when read in conjunction with the accompanying drawings.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

Figure 1:
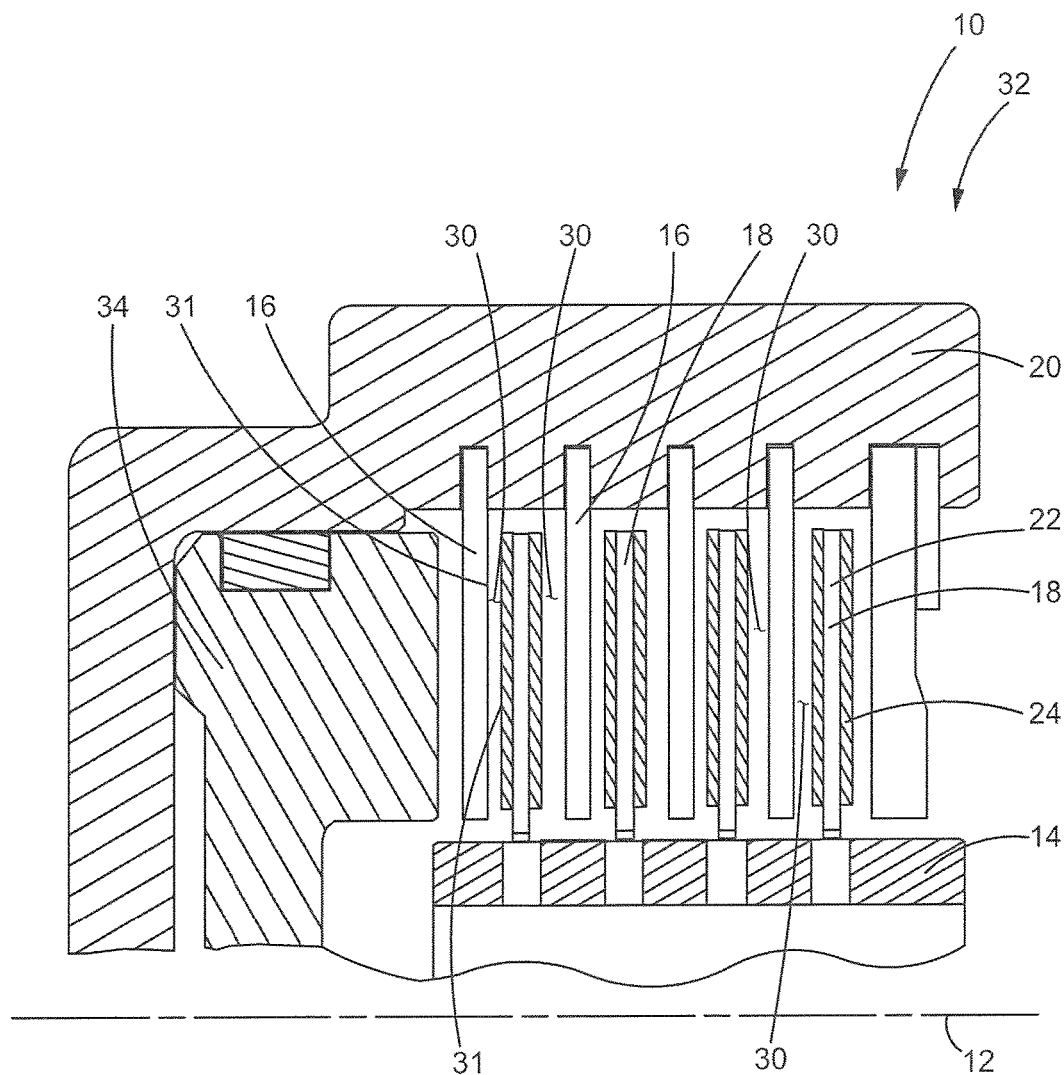
FIG. 1 is a schematic side cross-sectional representation of an upper portion of a clutch assembly or a brake assembly, constructed in accordance with the present disclosure.

Referring now to the drawings, and with specific reference to FIG. 1, an assembly 10 is depicted. The assembly 10 may be generally symmetrical about a central axis 12 such that the bottom portion of the assembly 10 is not illustrated. As one possibility, the assembly 10 may be a clutch assembly used in a vehicle automatic transmission. For example, it may be a wet clutch assembly, a dry clutch assembly, or a clutch component of a dual clutch automatic transmission, as will be apparent to those skilled in the art. If the assembly 10 is a clutch assembly used in a vehicle automatic transmission, it may be arranged with a series of other clutch assemblies behind a torque converter along a power path leading from the engine to the wheels. Alternatively, it may be a brake assembly for causing braking of the wheels of a tractor, an off-highway truck, or another type of vehicle. In this case, the assembly 10 may be a wet brake assembly or a dry brake assembly.

The assembly 10 may generally include a hub 14 capable of rotating about the central axis 12 and an alternating sequence of reaction plates 16 and friction elements 18. The friction elements 18 may be friction plates if the assembly 10 is a clutch assembly, or the friction elements 18 may be brake plates if the assembly 10 is a brake assembly. The assembly 10 may further include an outer housing 20 which may surround the hub 14 and the alternating sequence of the reaction plates 16 and the friction elements 18, as shown. The outer housing 20 may rotate about the central axis 12 or it may be held stationary. In addition, a fluid such as a transmission fluid (if the assembly 10 is a wet clutch assembly) or a brake fluid (if the assembly 10 is a wet brake assembly) may flow through the assembly 10 during operation.

Figure 2:
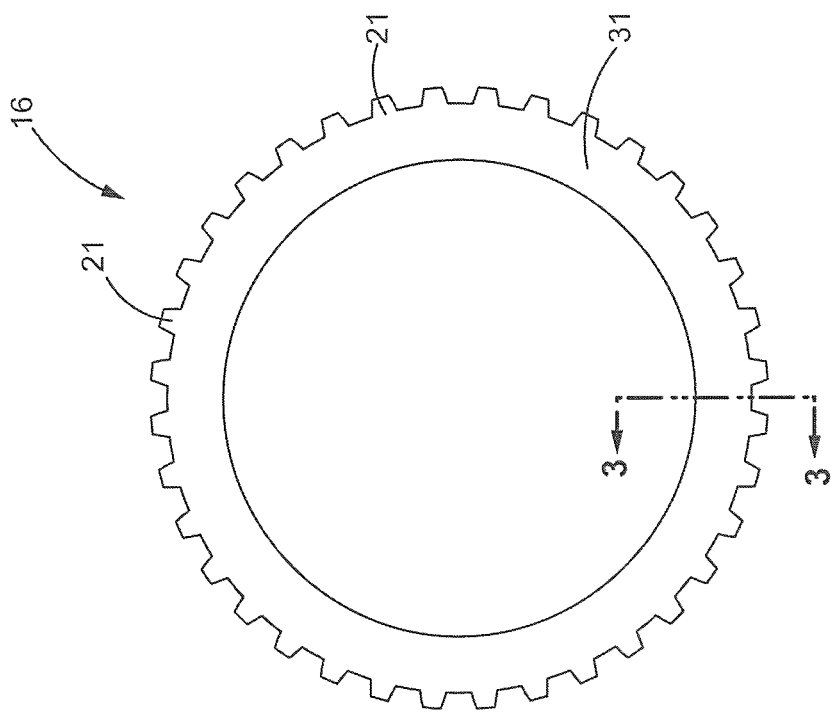
FIG. 2 is a front view of a reaction plate of the assembly of FIG. 1, constructed in accordance with the present disclosure.

The friction elements 18 may be splined with the hub 14 and they may be rotatable with the hub 14 about the central axis 12. In addition, each of the reaction plates 16 may have gear teeth 21 on an outer periphery (see FIG. 2) which may be splined to the outer housing 20, such that the reaction plates 16 may be rotatable with the outer housing 20 about the axis 12, or they may be held stationary with the outer housing 20 if it does not rotate. As an alternative possibility, the reaction plates 16 may have gear teeth on an inner periphery which may be splined to and rotatable with the hub 14, and the friction elements 18 may be splined to the outer housing 20. The assembly 10 may include various additional components, as will be understood by those with ordinary skill in the art.

If the assembly 10 is a clutch assembly, each of the friction elements 18 may consist of a central plate 22, which may be formed from a metallic material such as steel. In addition, each of the friction elements 18 may have a layer of friction material 24 bonded to each of the faces of the central plate 22, as shown in FIG. 1. If the assembly 10 is a brake assembly, the friction elements 18 may have a similar construction or an alternative construction. Each of the reaction plates 16 may be formed from a metallic material, such as steel or another suitable metal. In addition, one or more of the reaction plates 16 may have an internal cavity 26 configured to contain one or more phase change materials (PCMs) 28 (see FIG. 3 and further details below).

When the assembly 10 is in an open position 32 as shown in FIG. 1, the reaction plates 16 and the friction elements 18 may be spaced apart along the axis 12 such that the reaction plates 16 and the friction elements 18 may rotate independently of each other in different directions and/or at different speeds. However, in some situations, the reaction plates 16 or the friction elements 18 may be held stationary while the other plates (e.g., the reaction plates 16 or the friction elements 18) rotate. The assembly 10 may shift from the open position 32 to a closed position in which the reaction plates 16 and the friction elements 18 are pressed together along the axis 12 to restrict the relative rotation of the plates, such as when the clutch assembly is activated or when the brakes are applied. This may be achieved by the action of a piston 34, or by another mechanism. During the engagement of the reaction plates 16 and the friction elements 18, friction and heat may be generated at the friction interfaces 30 between the faces 31 of the reaction plates 16 and the friction elements 18 due to the relative rotation of the plates, and heat may continue to begenerated until the reaction plates 16 and the friction elements 18 are locked up and/or rotating at the same speed. The heat generated between the reaction plates 16 and the friction plates 18 may lead to a temperature rise at the friction interfaces 30. As will be appreciated by those with ordinary skill in the art, the magnitude of the temperature rise at the friction interfaces 30 may vary depending on several factors such as the design and use of the assembly 10. For example, the magnitude of the temperature spike at the friction interfaces 30 may be higher at higher relative rotational speeds between the reaction plates 16 and the friction elements 18.

Figure 3:
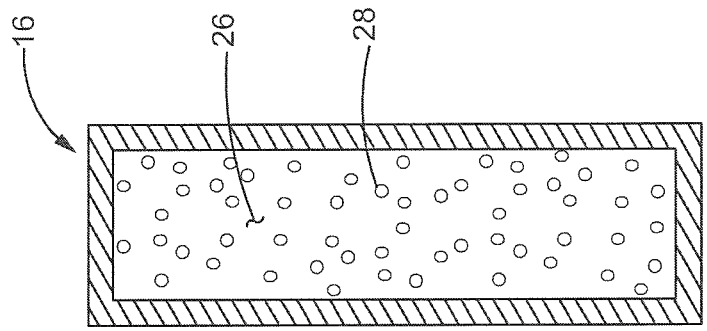
FIG. 3 is a cross-sectional view of the reaction plate of FIG. 2, taken along the line 3-3 of FIG. 2, depicting an internal cavity containing a phase change material, constructed in accordance with the present disclosure.

Turning now to FIG. 3, the internal cavity 26 of the reaction plate 16 may be completely or partially filled with the PCM(s) 28. Importantly, the PCM(s) 28 may be capable of absorbing at least a portion of the heat generated at the friction interfaces 30 in the closed position of the assembly 10, thereby reducing or limiting the temperature rise at the friction interfaces 30 (see further details below). In this way, the PCM(s) 28 may assist in protecting the reaction plates 16 from heat-induced damage such as heat-staining, hot-spotting, or smearing which may occur at higher temperatures. Moreover, the PCM(s) 28 may also assist in preventing heat-induced damage to the friction elements 18, the transmission fluid or brake fluid, and the assembly 10 as a whole.

The PCM 28 may be a material which undergoes a phase change at a phase change temperature with a concomitant absorbance or release of heat. The phase change may be a change from a first solid crystal structure to a second solid crystal structure, although other types of phase changes (solid-liquid, liquid-gas, etc.) may also apply in some cases. The phase change temperature of the PCM 28 may be within the range of the temperatures experienced at the friction interfaces 30 as the assembly 10 shifts from the open position to the closed position. More specifically, as the reaction plates 16 and the friction elements 18 are engaged when they are pressed together along the central axis 12, the temperature at the friction interfaces 30 may reach the phase change temperature of the PCM 28. At this point, the phase change material 28 may undergo a phase change and absorb heat, thereby causing the temperature rise at the friction interfaces to either slow down or stall.

Figure 4:
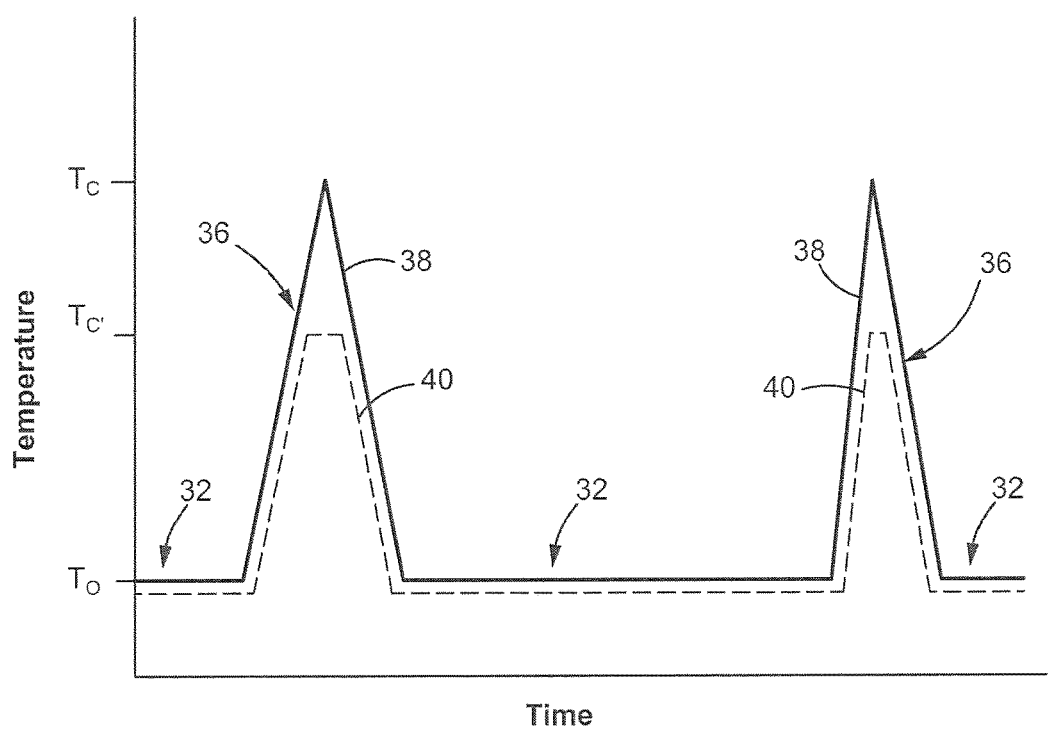
FIG. 4 is an exemplary temperature versus time profile at a friction interface between the reaction plate and a friction element of the assembly of FIG. 1 (dashed) overlaid with an exemplary temperature versus time profile at a friction interface of an assembly of the prior art (solid).

The effect of the PCM 28 on the temperature rise at the friction interface(s) of the assembly 10 may be more readily appreciated by reference to FIG. 4 which illustrates exemplary temperature versus time profiles at a friction interface 30 of the assembly 10 of the present disclosure having the PCM 28 contained in the reaction plates 16 (dashed) and an assembly of the prior art lacking a PCM (solid). In both the assembly 10 and the prior art assembly, the friction interface may have a lower temperature ($T_o$) in the open position 32 when the reaction plates 16 and the friction elements 18 are separated, as shown. As the plates are engaged when shifting to the closed position 36, a temperature spike 38 may occur at the friction interfaces of the prior art assembly until a maximum temperature ($T_c$) is reached and the plates are rotating at the same speed. However, as the reaction plates 16 and the friction elements 18 of the assembly 10 are engaged in the assembly 10, a temperature spike 40 may have a lower maximum temperature ($T_{c'}$) due to heat absorbance by the PCM 28 as it undergoes an endothermic phase change at its characteristic phase change temperature. The PCM 28 may cap (or stall) the temperature spike 40 at or near its phase change temperature, as shown in FIG. 4. Alternatively, the PCM 28 may lower the slope of the temperature spike 40 at or near its phase change temperature. In some cases, the phase change of the PCM 28 (and the absorbance of heat at the friction interface 30) may continue until the reaction plates 16 and the friction elements 18 reach the same rotational speed, and the temperature of the friction interface 30 falls to $T_o$, as depicted in FIG. 4. However, in some situations, the PCM 28 may complete its phase change before the reaction plates 16 and the friction elements 18 reach the same rotational speed, in which case the temperature at the friction interface 30 may rise or rise more sharply once the phase change is complete (not shown). Those skilled in the art will understand that the exemplary profiles illustrated in FIG. 4 are intended for illustration purposes only, and may deviate significantly in practice depending on the design and operation of the assembly 10.

The phase change temperature of the PCM 28 may be between about 120° C. to about 300° C., but may vary from this range depending on the temperature range at the friction interfaces 30 experienced in practice. In some arrangements, the PCM 28 may have a phase change temperature in the range of about 160° C. to about 180° C. As non-limiting examples, suitable phase change materials may be PlusICE® X165 or PlusICE® X180 which are polyhydric alcohol blends commercially available from Phase Change Materials Products Limited located in Cambridgeshire, United Kingdom. In particular, PlusICE® X165 and PlusICE® X180 may undergo a transition between a first solid crystal structure and a second solid crystal structure at 165° C. and 180° C., respectively, with a concomitant absorbance (or release) of heat. However, other types synthetic or commercially available phase change materials such as, but not limited to, various salt hydrates, organic compounds, polyglycols, waxes, oils, and fatty acids may also be used.

Figure 5:
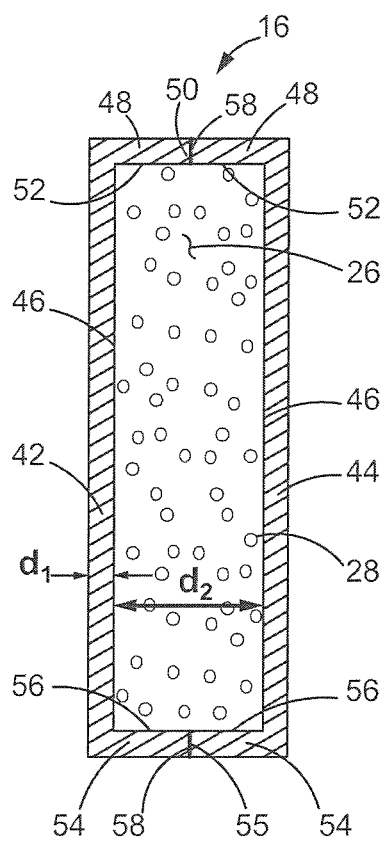
FIG. 5 a cross-sectional view similar to FIG. 3, but showing a bond between a first portion and a second portion of the reaction plate to create the internal cavity, constructed in accordance with the present disclosure.
Figure 6:
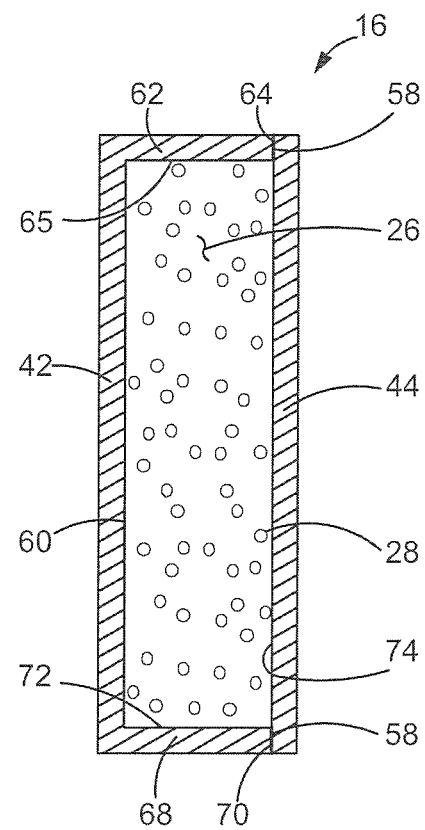
FIG. 6 is a cross-sectional view similar to FIG. 5, but with the first portion and the second portion having different structures, constructed in accordance with the present disclosure.

To create the internal cavity 26, the reaction plate 16 of the assembly 10 may be formed in two portions, including a first portion 42 and a second portion 44, as shown in FIG. 5. As one possibility, the first portion 42 and the second portion 44 may be symmetrical and each may have an internal wall 46, an upper overhang 48 with an upper edge 50 and an inner surface 52, and a lower overhang 54 with a lower edge 55 and an inner surface 56, as shown. A bond 58 may be formed at an interface between the upper edges 50 of the first portion 42 and the second portion 44 and at an interface between the lower edges 55 of the first portion 42 and the second portion 44, as shown in FIG. 5. In this arrangement, the internal cavity 26 may be formed between the internal walls 46 and the inner surfaces 52 and 56 of the first portion 42 and the second portion 44, as shown. As an another possibility, the first portion 42 may have an internal wall 60, an upper overhang 62 with an upper edge 64 and an inner surface 65, and a lower overhang 68 with a lower edge 70 and an inner surface 72, and the second portion 44 may have a plate-like structure with an internal wall 74 (see FIG. 6). The bond 58 may be formed between the upper edge 64 of the first portion 42 and the internal wall 74 of the second portion 44, and between the lower edge 70 of the first portion 42 and the internal wall 74 of the second portion 44, as shown in FIG. 6. In this case, the cavity 26 for containing the PCM 28 may be formed between the internal walls 60, 74 and the inner surfaces 65 and 72, as shown. In the arrangements depicted in FIG. 5 and FIG. 6, the bond 58 may be generated using a thermoset resin, a suitable adhesive, by welding, or by another metal joining process. It will be understood that a variety of other structural arrangements for providing the internal cavity 26 in the reaction plate 16 are also encompassed within the scope of this disclosure. In addition, in alternative arrangements, the PCM(s) 28 may be incorporated into other components of the assembly 10 to provide temperature control at the friction interfaces 30, such as the friction elements 18 or other suitable components.

Figure 7:
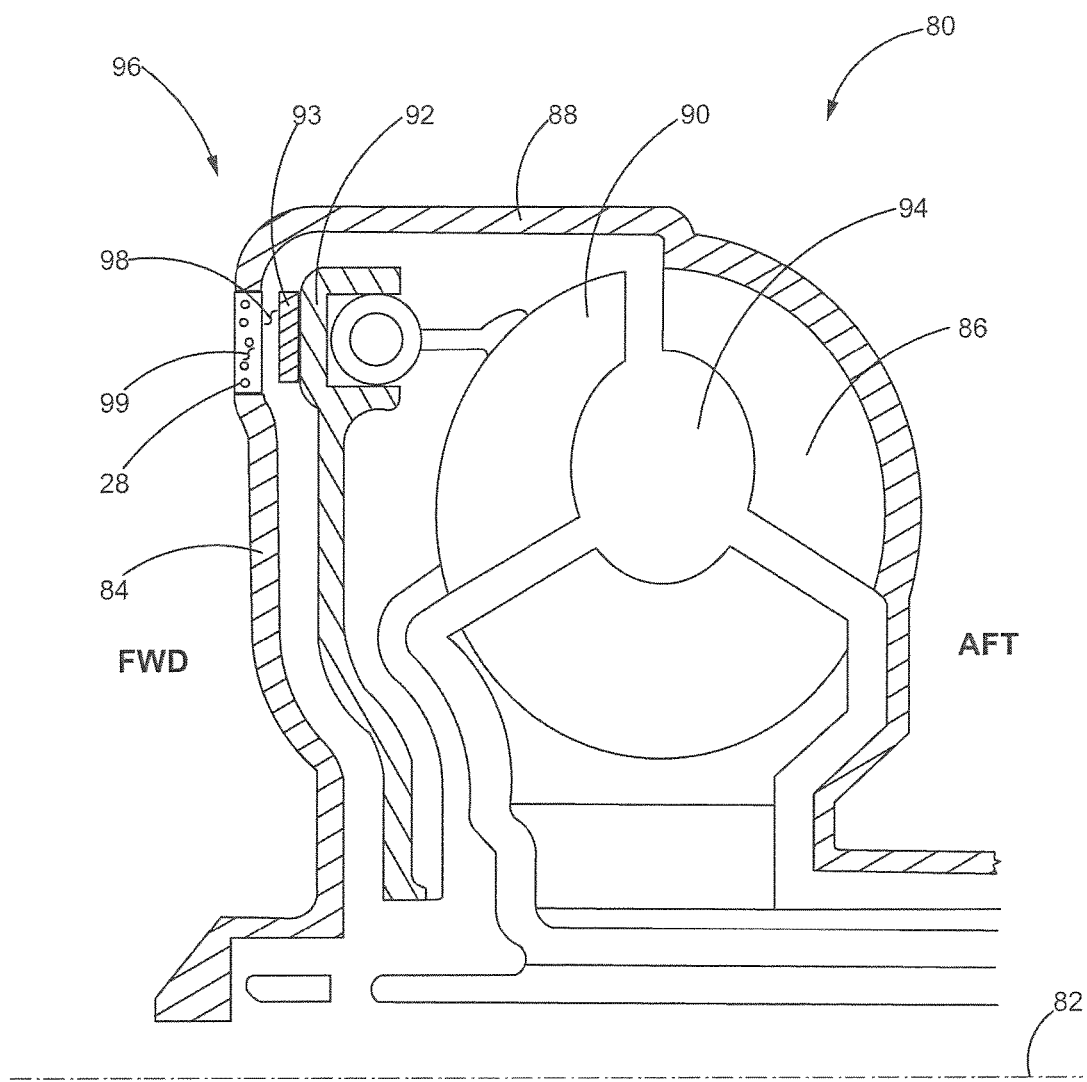
FIG. 7 is a side cross-sectional view of an upper portion of a torque converter clutch assembly, constructed in accordance with the present disclosure.

In accordance with another arrangement of the present disclosure, the PCM 28 may be used to control temperature spikes at friction interfaces in a torque converter clutch assembly 80, as shown in FIG. 7 (with only the upper portion of the assembly 80 shown as it may be generally symmetrical about a central axis 82). As the structure and operation of torque converter clutch assemblies are well understood by those with ordinary skill in the art, only its main components are shown and described herein. In general, the torque converter clutch assembly 80 may include a front cover plate 84 which may be operatively connected to a vehicle engine (not shown), an impeller 86 which may be connected to the front cover plate 84 by an outer housing 88, a turbine 90 which may be connected to an input shaft of the transmission, one or more piston plates 92 connected to the turbine 90 and located between the front cover plate 84 and the turbine 90, as well as an oil or a transmission fluid which may flow through the assembly 80. In addition, the piston plate 92 may have a friction material 93 on a surface facing the front cover plate 84, as shown. In operation, power from the engine may first be transmitted to the front cover plate 84 causing the plate 84 and the impeller 86 to revolve. The impeller 86 may then cause the turbine 90 to revolve by pushing the oil or transmission fluid against the turbine 90, and a stator 94 may return the oil or transmission fluid from the turbine 90 back to the impeller 86. Notably, the torque converter clutch assembly 80 may be capable of shifting between an open position 96 in which the piston plate 92 may be disengaged from the front cover plate 84, allowing the turbine to apply torque, and a closed position in which the piston plate 92 may be hydraulically translated in an axially forward direction and pushed against the front cover plate 84 to create a direct connection between the engine and the transmission. Various sensors in the engine may determine when the open position 96 is appropriate, such as during vehicle acceleration from a stop, and when the closed position is appropriate, such as when the vehicle has gained speed. It will be understood that more complex torque converter clutch assembly designs are also encompassed within the scope of this disclosure.

As the piston plate 92 is engaged with the front cover plate 84 in the closed position or while shifting to the closed position, friction-induced heat may be generated at a friction interface 98 between the piston plate 92 and the front cover plate 84 while there is relative motion between the piston plate 92 and the front cover plate 84, causing a temperature rise at the friction interface 98. The generation of heat may continue in the closed position until the piston plate 92 and the front cover plate 84 are locked up or rotating at the same speed. Analogous to the assembly 10 described above, the temperature rise may cause temperature-induced damage to the metal material of the front cover plate 84, the friction material 93, as well as the assembly 80 as a whole. Furthermore, temperature rise at the friction interface 98 may lead to chemical degradation of the oil or transmission fluid flowing through the assembly 80.

In order to counteract the heat generation at the friction interface 98, the front cover plate 84 may have one or more internal cavities 99 which may be completely or partially filled with one or more PCMs 28, as shown. The internal cavity 99 may be localized near the friction interface 98 between the piston plate 92 and the front cover plate 84 to promote heat capture by the PCM 28, as shown in FIG. 7, or one or more internal cavities 99 may extend along a greater radial width of the front cover plate 84. According to the mechanisms described above (see FIG. 4, for example), the PCM 28 may absorb at least a portion of the heat generated at the friction interface 98 as it undergoes a phase change at its characteristic phase change temperature, thereby assisting to protect the assembly 80 from temperature-induced damage. In addition, the internal cavity 99 may be created in the front cover plate 84 by fabricating the plate 92 in two portions and bonding or otherwise joining the portions together, analogous to the structural arrangements described above and shown in FIGS. 5-6 for the reaction plate 16. As an alternative possibility, the PCM 28 may be contained in one or more internal cavities within the piston plate 92.

Figure 8:
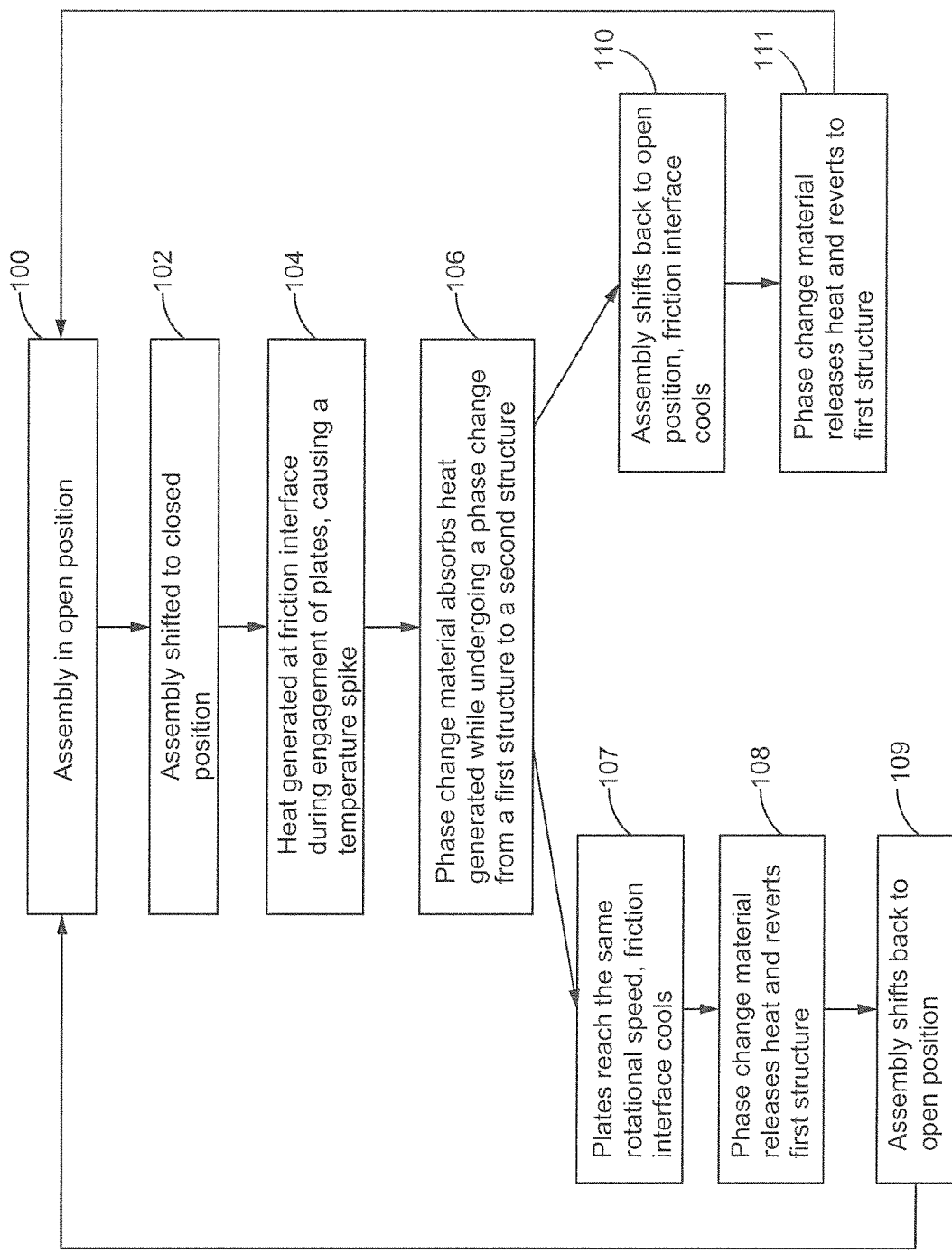
FIG. 8 is a flowchart depicting a series of steps which may occur during the operation of the assembly of FIG. 1 or during the operation of the torque converter clutch assembly of FIG. 7, in accordance with a method of the present disclosure.

FIG. 8 depicts a series of steps that may be involved in the operation of the assembly 10 or the assembly 80. According to a first block 100, the assembly 10 or the assembly 80 may be in the open position. According to a next block 102, the assembly 10 or the assembly 80 may be shifted to the closed position as the reaction plates 16 and the friction elements 18 are pressed together along the axis 12 (in the assembly 10) or as the piston plate 92 is pressed against the front cover plate 84 (in the assembly 80). The engagement of the plates (i.e., the reaction plates 16 and the friction elements 18 or the piston plate 92 and the front cover plate 84) may cause heat generation and a temperature spike at the friction interface (s) in the assembly 10 or in the assembly 80 due to friction caused by any relative motion between the plates (block 104). Once the temperature at the friction interface(s) reaches the phase change temperature of the PCM 28, the PCM 28 may absorb the heat at the friction interface(s) as it undergoes a phase change from a first structure to a second structure according to a next block 106, causing the temperature rise at the friction interface(s) to stall or rise more slowly (see FIG. 4, for example). As described above, the phase change may be a change from a first solid crystal structure to a second solid crystal structure, or another type of phase change. If the plates reach the same rotation speed, the friction interface(s) may cool (block 107), allowing the phase change material to revert to the first structure (block 108). At some point, the assembly 10 or the assembly 80 may shift back to the open position (block 109), allowing the cycle to repeat, as shown. Alternatively, the assembly may revert to the open position before the plates have a chance to reach the same rotational speed, and the friction interface (s) may cool due to the separation of the plates (block 110). The cooling of the friction interface(s) allows the PCM 28 to revert to the first structure (block 111), and the cycle may repeat as shown.

INDUSTRIAL APPLICABILITY

In general, it can therefore be seen that the technology disclosed herein may have industrial applicability in a variety of settings including, but not limited to, clutch assembly construction, torque converter clutch assembly construction, and brake assembly construction. The present disclosure introduces a strategy for protecting clutch assemblies, torque converter clutch assemblies, and brake assemblies from thermal damage which may occur as plates are pressed together causing friction, such as when the clutch or brakes are actuated. As disclosed herein, the strategy relies on incorporating one or more heat-absorbing phase change materials into an internal cavity of one or more of the reaction plates in a clutch assembly or a brake assembly, or in a front cover plate of a torque converter clutch assembly. In this way, the phase change material(s) may act as a temperature management or a temperature control system by capturing at least a fraction of the heat generated at friction interfaces in clutch assemblies, torque converter clutch assemblies, or brake assemblies, thereby protecting the reaction plates/front cover plate from heat-induced damage such as heat-staining or hot spotting while also protecting the transmission fluid or brake fluid from thermal degradation processes. In addition, the incorporation of the phase change material(s) into a clutch assembly may assist in preventing heat-induced damage to friction materials on the surface of the friction plates or piston plate, and therefore, may allow for lower-cost friction materials to be used in the aforementioned assembly systems. Moreover, the improved heat resistance of the clutch assemblies, torque converter clutch assemblies, and brake assemblies of the present disclosure may allow for higher operating pressures and/or higher differential speeds in some cases. Even further, the reaction plate/front cover plate constructions disclosed herein may provide lighter-weight reaction plates/front cover plates, which may be beneficial for numerous applications such as brake systems in construction and agricultural applications which use larger reaction plates with higher internal volumes. Accordingly, the technology disclosed herein may find wide industrial applicability in areas such as, but not limited to, automotive, construction, and agricultural applications.

What is claimed:

1. A clutch assembly for an automotive transmission, comprising:
    a hub capable of rotating about a central axis;
    a plurality of friction plates;
    a plurality of reaction plates arranged in an alternating sequence with the plurality of friction plates, the reaction plates and the friction plates being capable of shifting between an open position in which the reaction plates and the friction plates are spaced apart from each other along the central axis and a closed position in which the reaction plates and the friction plates are pressed together along the central axis, heat being generated between the reaction plates and the friction plates while there is relative motion between the reaction plates and the friction plates in the closed position, at least one of the reaction plates having inner wall surfaces fully enclosing an internal cavity;
    at least one phase change material contained in the internal cavity and fully enclosed within the inner wall surfaces, the at least one phase change material comprising a phase change temperature at which a phase change occurs and being capable of absorbing at least some of the heat while undergoing the phase change, the phase change temperature of the phase change material being between about 120° C. and about 300° C.; and
    an outer housing surrounding the hub and the alternating sequence of the reaction plates and the friction plates.

2. The clutch assembly of claim 1, wherein each of the reaction plates are splined to the outer housing, and wherein each of the friction plates are splined to the hub and are rotatable with the hub about the central axis.

3. The clutch assembly of claim 1, wherein the phase change temperature is between about 160° C. and about 180° C.

4. The clutch assembly of claim 1, wherein each of the reaction plates are formed from steel.

5. The clutch assembly of claim 1, wherein the at least one reaction plate having the internal cavity lacks a bellows structure.

6. The clutch assembly of claim 1, wherein the phase change is a change from a first solid crystal structure to a second solid crystal structure.

7. The clutch assembly of claim 1, wherein the phase change material is a polyhydric alcohol blend.

8. A brake assembly for a vehicle, comprising:
    a hub capable of rotating about a central axis;
    a plurality of brake plates;
    a plurality of reaction plates arranged in an alternating sequence with the plurality of brake plates, the reaction plates and the brake plates being capable of shifting between an open position in which the reaction plates and the brake plates are spaced apart along the central axis and a closed position in which the reaction plates and the brake plates are pressed together along the central axis, at least one of the reaction plates having an internal cavity;
    at least one phase change material contained in the internal cavity, the phase change material being a polyhydric alcohol blend and having a phase change temperature between about 160° C. and about 180° C.; and
    an outer housing surrounding the hub and the alternating sequence of the reaction plates and the brake plates.

9. The brake assembly of claim 8, wherein heat is generated between the reaction plates and the brake plates while there is relative motion between the reaction plates and the brake plates in the closed position, and wherein the at least one phase change material is capable of absorbing at least some of the heat generated while undergoing a phase change.

10. The brake assembly of claim 9, wherein each of the reaction plates are splined to the outer housing, and wherein each of the brake plates are splined to the hub and are rotatable with the hub about the central axis.

11. The brake assembly of claim 9, wherein the phase change temperature is between about 165° C. to about 180° C.

12. The brake assembly of claim 9, wherein the brake assembly is a wet brake assembly.

13. The brake assembly of claim 9, wherein the at least one reaction plate having an internal cavity consists of a first portion and a second portion joined by a bond, and wherein the internal cavity is formed between the first portion and the second portion.

14. A brake assembly for a vehicle, comprising:
    a hub capable of rotating about a central axis;
    a plurality of brake plates;
    a plurality of reaction plates arranged in an alternating sequence with the plurality of brake plates, the reaction plates and the brake plates being capable of shifting between an open position in which the reaction plates and the brake plates are spaced apart along the central axis and a closed position in which the reaction plates and the brake plates are pressed together along the central axis, at least one of the reaction plates having inner wall surfaces fully enclosing an internal cavity;
    at least one phase change material contained in the internal cavity and fully enclosed within the inner wall surfaces of the at least one reaction plate, the at least one phase change material comprising a phase change temperature at which a phase change occurs, the phase change temperature of the phase change material being between about 120° C. and about 300° C.; and
    an outer housing surrounding the hub and the alternating sequence of the reaction plates and the brake plates.

* * * * *